United States Patent
Jacobson et al.

(10) Patent No.: US 7,740,966 B2
(45) Date of Patent: Jun. 22, 2010

(54) ELECTROCHEMICAL CELL STACK ASSEMBLY

(75) Inventors: Craig P. Jacobson, Lafayette, CA (US); Steven J. Visco, Berkeley, CA (US); Lutgard C. De Jonghe, Lafayette, CA (US)

(73) Assignee: The Regents of the University of California, Oakland, CA (US)

( * ) Notice: Subject to any disclaimer, the term of this patent is extended or adjusted under 35 U.S.C. 154(b) by 732 days.

(21) Appl. No.: 11/512,521

(22) Filed: Aug. 30, 2006

(65) Prior Publication Data

US 2007/0059576 A1 Mar. 15, 2007

Related U.S. Application Data

(63) Continuation of application No. 10/434,403, filed on May 7, 2003, now abandoned.

(60) Provisional application No. 60/378,701, filed on May 7, 2002.

(51) Int. Cl.
*H01M 8/10* (2006.01)

(52) U.S. Cl. .............................. 429/31; 429/32; 429/33; 429/34

(58) Field of Classification Search .................... 429/31, 429/30, 34, 38, 40, 35, 32, 33

See application file for complete search history.

(56) References Cited

U.S. PATENT DOCUMENTS

| 4,728,584 | A |  | 3/1988 | Isenberg |
|---|---|---|---|---|
| 4,774,153 | A |  | 9/1988 | Sterzel |
| 5,458,989 | A |  | 10/1995 | Dodge |
| 5,509,942 | A |  | 4/1996 | Dodge |
| 5,549,983 | A |  | 8/1996 | Yamanis |
| 5,827,620 | A | * | 10/1998 | Kendall ........................ 429/31 |
| 5,942,349 | A | * | 8/1999 | Badwal et al. ................. 429/34 |
| 2002/0110717 | A1 | * | 8/2002 | Basel et al. .................... 429/32 |
| 2003/0134169 | A1 | * | 7/2003 | Sarkar et al. .................. 429/31 |

FOREIGN PATENT DOCUMENTS

| GB | 2339063 | 1/2000 |
|---|---|---|
| WO | WO 98-50975 A | 11/1998 |

* cited by examiner

*Primary Examiner*—Raymond Alejandro
(74) *Attorney, Agent, or Firm*—Fulbright & Jaworski L.L.P.

(57) ABSTRACT

Multiple stacks of tubular electrochemical cells having a dense electrolyte disposed between an anode and a cathode preferably deposited as thin films arranged in parallel on stamped conductive interconnect sheets or ferrules. The stack allows one or more electrochemical cell to malfunction without disabling the entire stack. Stack efficiency is enhanced through simplified gas manifolding, gas recycling, reduced operating temperature and improved heat distribution.

19 Claims, 7 Drawing Sheets

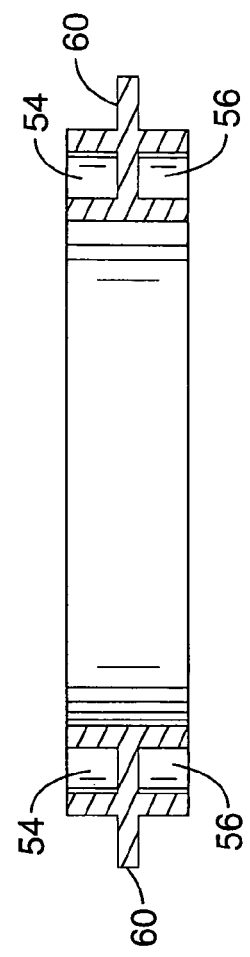
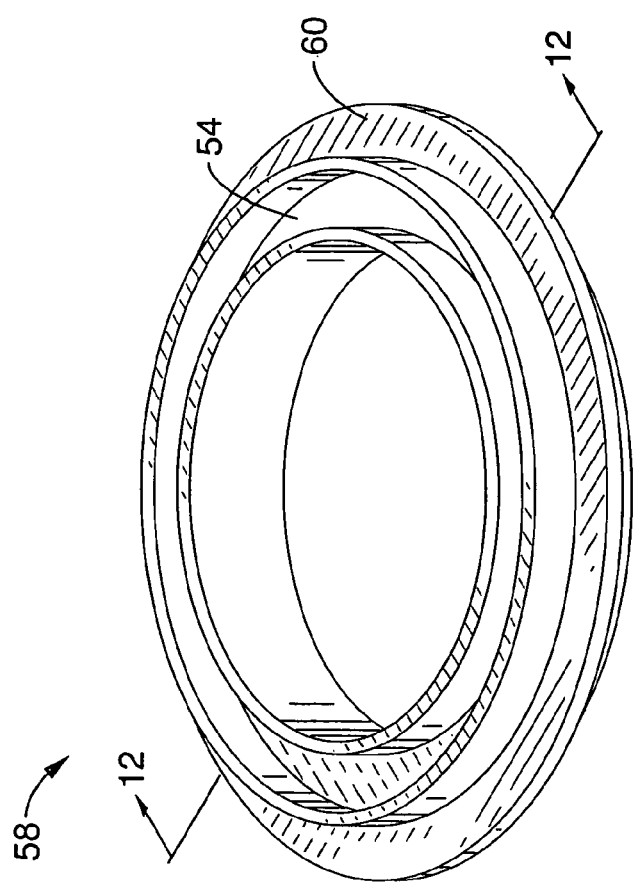
FIG. 12
FIG. 11

ELECTROCHEMICAL CELL STACK ASSEMBLY

CROSS-REFERENCE TO RELATED APPLICATIONS

This application is a continuation application of U.S. Ser. No. 10/434,403 filed May 7, 2003 now abandoned, which claims priority from U.S. provisional application Ser. No. 60/378,701 filed on May 7, 2002, each of which is incorporated herein by reference.

STATEMENT REGARDING FEDERALLY SPONSORED RESEARCH OR DEVELOPMENT

This invention was made with government support under Grant (Contract) No. DE-AC03-76F00098 awarded by the United States Department of Energy. The government has certain rights to this invention.

INCORPORATION-BY-REFERENCE OF MATERIAL SUBMITTED ON A COMPACT DISC

Not Applicable

BACKGROUND OF THE INVENTION

1. Field of the Invention

This invention pertains generally to solid-state electrochemical device assemblies, and more particularly to a modular parallel electrochemical cell in series stack.

2. Description of Related Art

Steadily increasing demand for power and the atmospheric build up of greenhouse and other combustion gases has spurred the development of alternative energy sources for the production of electricity. Fuel cells, for example, hold the promise of an efficient, low pollution technology for generating electricity. Because there is no combustion of fuel involved in the process, fuel cells do not create any of the pollutants that are commonly produced in the conventional generation of electricity by boilers or furnaces and steam driven turbines.

Unfortunately, the present cost of electrical energy production from fuel cells is several times higher than the cost of the same electrical production from fossil fuels. The high cost of capitalization and operation per kilowatt of electricity produced has delayed the commercial introduction of fuel cell generation systems.

A conventional fuel cell is an electrochemical device that converts chemical energy from a chemical reaction with the fuel directly into electrical energy. Electricity is generated in a fuel cell through the electrochemical reaction that occurs between a fuel (typically hydrogen produced from reformed methane) and an oxidant (typically oxygen in air). This net electrochemical reaction involves charge transfer steps that occur at the interface between the ionically conductive electrolyte membrane, the electronically-conductive electrode and the vapor phase of the fuel or oxygen. Water, heat and electricity are the only products of one type of fuel cell system designed to use hydrogen gas as fuel. Other types of fuel cells that have been developed include molten carbonate fuel cells, phosphoric acid fuel cells, alkaline fuel cells, proton exchange membrane fuel cells. Because fuel cells rely on electrochemical rather than thermomechanical processes in the conversion of fuel into electricity, the fuel cell is not limited by the Carnot efficiency experienced by conventional mechanical generators.

Solid-state electrochemical devices are normally cells that include two porous electrodes, the anode and the cathode, and a dense solid electrolyte membrane disposed between the electrodes. In the case of a typical solid oxide fuel cell, the anode is exposed to fuel and the cathode is exposed to an oxidant in separate closed systems to avoid any mixing of the fuel and oxidants due to the exothermic reactions that can take place with hydrogen fuel.

The electrolyte membrane is normally composed of a ceramic oxygen ion conductor in solid oxide fuel cell applications. In other implementations, such as gas separation devices, the solid membrane may be composed of a mixed ionic electronic conducting material ("MIEC"). The porous anode may be a layer of a ceramic, a metal or, most commonly, a ceramic-metal composite ("cermet") that is in contact with the electrolyte membrane on the fuel side of the cell. The porous cathode is typically a layer of a mixed ionically and electronically conductive (MIEC) metal oxide or a mixture of an electronically conductive metal oxide (or MIEC metal oxide) and an ionically conductive metal oxide.

Solid oxide fuel cells normally operate at temperatures between about 900° C. and about 1000° C. to maximize the ionic conductivity of the electrolyte membrane. At appropriate temperatures the oxygen ions easily migrate through the crystal lattice of the electrolyte. However, most metals are not stable at the high operating temperatures and oxidizing environment of conventional fuel cells and become converted to brittle metal oxides. Accordingly, solid-state electrochemical devices have conventionally been constructed of heat-tolerant ceramic materials. However, these materials tend to be expensive and still have a limited life in high temperature and high oxidation conditions. In addition, the materials used must have certain chemical, thermal and physical characteristics to avoid delamination due to thermal stresses, fuel or oxidant infiltration across the electrolyte and similar problems during the production and operation of the cells.

Since each fuel cell generates a relatively small voltage, several fuel cells may be associated to increase the capacity of the system. Such arrays or stacks generally have a tubular or planar design. Planar designs typically have a planar anode-electrolyte-cathode deposited on a conductive interconnect and stacked in series. However, planar designs are generally recognized as having significant safety and reliability concerns due to the complexity of sealing of the units and manifolding a planar stack.

In addition, conventional stacks of planar fuel cells operated at the higher temperature of approximately 1000° C. have relatively thick electrolyte layers compared to the porous anode and cathode layers applied to either side of the electrolyte and provides structural support to the cell. However, in order to reduce the operating temperature to less than 800° C., the thickness of the electrolyte layer has been reduced from more than 50-500 microns to approximately 5-50 microns. The thin electrolyte layer in this configuration is not a load bearing layer. Rather, the relatively weak porous anode and cathode layers must bear the load for the cell. Stacks of planar fuel cells supported by weak anodes or cathodes may be prone to collapse under the load.

Tubular designs utilizing long porous support tubes with electrodes and electrolyte layers disposed on the support tube reduce the number of seals that are required in the system. Fuel or oxidants are directed through the channels in the tube or around the exterior of the tube. However, tubular designs provide less power density because of the relatively long current path on the electrodes since the current collection for the entire tube occurs on only a small area on the circumference of the tube. This contributes to internal resistive losses thereby limiting power density.

In addition, the concentration of the reactants often diminishes as gas flows through the channels along the length of the tubes if an insufficient volume of reactants is directed through the apparatus. Decreased gas concentration at the anode, for example, will result in a reduction in the electrical output of the cell depending on the position of the cell in the stack. Increasing the volume of fuel or oxidants flowing through the apparatus may result in excess reactants exhausting the system along with the reaction products of the electrochemical device. Excess reactants are typically burned to provide operating heat for the solid fuel cells in conventional devices. Excess reactants that exhaust the system and are burned further reduce the efficiency of the apparatus.

Another significant problem encountered with planar stacks with repeating cell elements is that the failure of one cell may result in the failure of the entire stack. Malfunctioning cells in present designs may require cooling the stack and taking it off line to replace a single cell.

Thus, present solid-state electrochemical devices incorporating conventional designs are expensive to manufacture and may suffer from safety, reliability, and/or efficiency concerns.

Accordingly, there is a need to provide a stack or array of electrochemical devices, such as solid oxide fuel cells, that are capable of operating efficiently at lower temperatures and use less expensive materials and production techniques. Stack designs that reduce the cost of materials and manufacturing while increasing the reliability of fuel cells and other solid state electrochemical devices, may allow for the commercialization of such devices that have been previously too expensive, inefficient or unreliable to exploit. The present invention satisfies these needs, as well as others, and generally overcomes the deficiencies in conventional devices.

BRIEF SUMMARY OF THE INVENTION

An apparatus is provided for a stack of tubular electrochemical cells that can operate at lower operating temperatures and has improved fuel efficiency and electricity production over the art. By way of example, and not of limitation, in accordance with one aspect of the invention a stack of arrays of tubular solidstate electrochemical cells connected in parallel to interconnect plates is provided and the arrays are connected in series.

According to another aspect of the invention, the electrochemical devices are either anode, cathode or electrolyte supported tubes preferably oriented perpendicularly to the interconnect plates.

According to another aspect of the invention, interconnect plates are provided that are connected to the anode of one set of tubular cells and the cathodes of a second set of tubular cells.

In accordance with yet another aspect of the invention, top and bottom electrochemical cells are sealed to a ferrule, which may be attached to an interconnect plate or to stack electrochemical cells within a row.

According to one embodiment of the invention, the electrochemical cell layer has a first electrode layer that is formed into a tube by any number of methods such as extrusion, injection molding, deposition on a mandrel, pressing, tape casting and the like. The first electrode can be made of material to provide either an anode or a cathode. A preferably thin film electrolyte layer of ion conducting material is applied to the tubular electrode that is essentially gas impermeable. A second electrode layer is then applied to the exterior surface of the electrolyte.

In another embodiment of the invention, the electrolyte layer is dimensioned to be a support layer and a first electrode layer is applied to the interior of the tube and a second electrode is applied to the exterior of the electrolyte tube.

In one embodiment of the invention, a number of holes and formed joints are punched into a metallic interconnect plate. The tubular electrochemical devices are attached and sealed to both sides of the interconnect holes to form a continuous preferably gas tight passageway through the center of the tubes. The interconnect plate is in electrical contact with the anode of one tubular cell and the cathode of the other tubular cell.

An object of the invention is to provide parallel arrays of tubular electrochemical devices with thin films of electrolyte and electrode layers that can be organized in stacks of parallel arrays and connected in series.

Another object of the invention is to provide an array of electrochemical devices that is configured to avoid a failure of the array upon failure of a single electrochemical device in the array.

Another object of the invention is to provide a solid oxide fuel cell that has an operating temperature of less than approximately 800° C.

Another object of the invention is to provide an electrochemical cell that is durable, reliable and is easy to manufacture.

Another object of the invention is to provide a stack of electrochemical cells that have long term stability with reduced cost.

Still another object of the invention is to provide a stack of electrochemical cells that is resistant to thermal shock.

Further aspects and objects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWINGS

The invention will be more fully understood by reference to the following drawings which are for illustrative purposes only:

FIG. 11 is a perspective view of a ferrule used in an alternative embodiment of the invention as a junction between top and bottom electrochemical cells.

FIG. 12 is a cross section of the ferrule of FIG. 11 taken along the lines 12-12 in FIG. 11.

DETAILED DESCRIPTION OF THE INVENTION

Referring more specifically to the drawings, for illustrative purposes the present invention is embodied in the apparatus generally shown in FIG. 1 through FIG. 15. It will be appreciated that the apparatus may vary as to configuration and as to details of the parts without departing from the basic concepts as disclosed herein.

Figure 1:
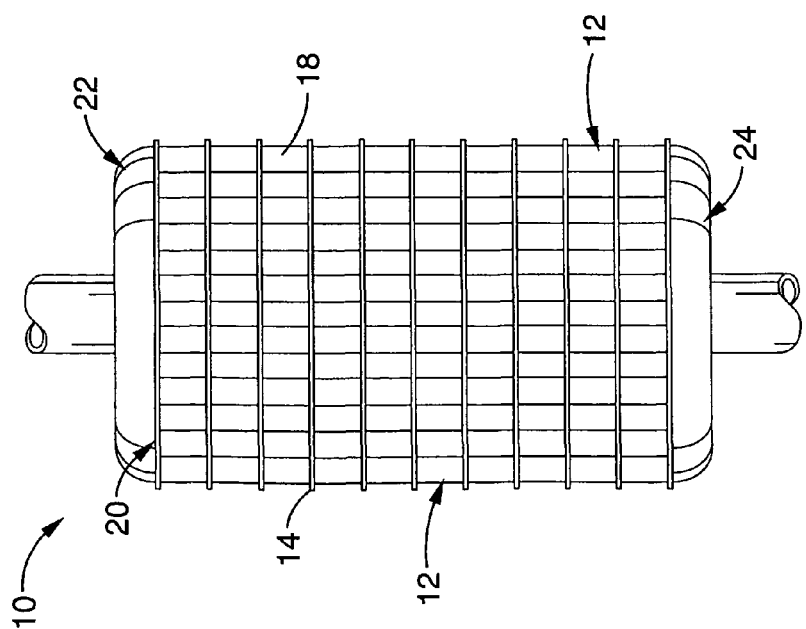
FIG. 1 is a side view of an stack of electrochemical cells according to the present invention.

Turning now to FIG. 1, one embodiment of a stack 10 of parallel arrays of electrochemical cells 18 with planar interconnect sheets is shown. In the embodiment shown in FIG. 1, arrays of fifty tubular cells are stacked ten high. It will be apparent that the invention can be configured to use virtually any number of tubes and those tubes can be stacked to virtually any number of levels. Although a tubular electrochemical cell is shown as a cylindrical cell for illustration, it will be understood that the tubular electrochemical cell can have any shaped cross section that will preferably maximize the packing density and efficiency of the stack. For example, the electrochemical cells may have a square, octagonal, oval or preferably rectangular cross sections and may have one or more channels running axially through the cell.

Figure 2:
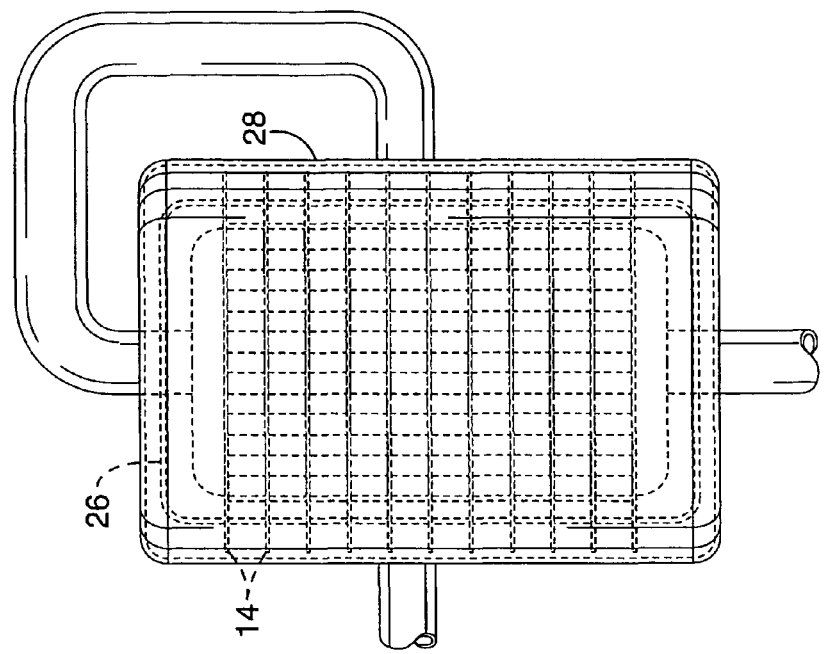
FIG. 2 is a side detailed view of one tubular electrochemical cell of one embodiment of a stack of electrochemical cells according to the invention shown in FIG. 1.
Figure 3:
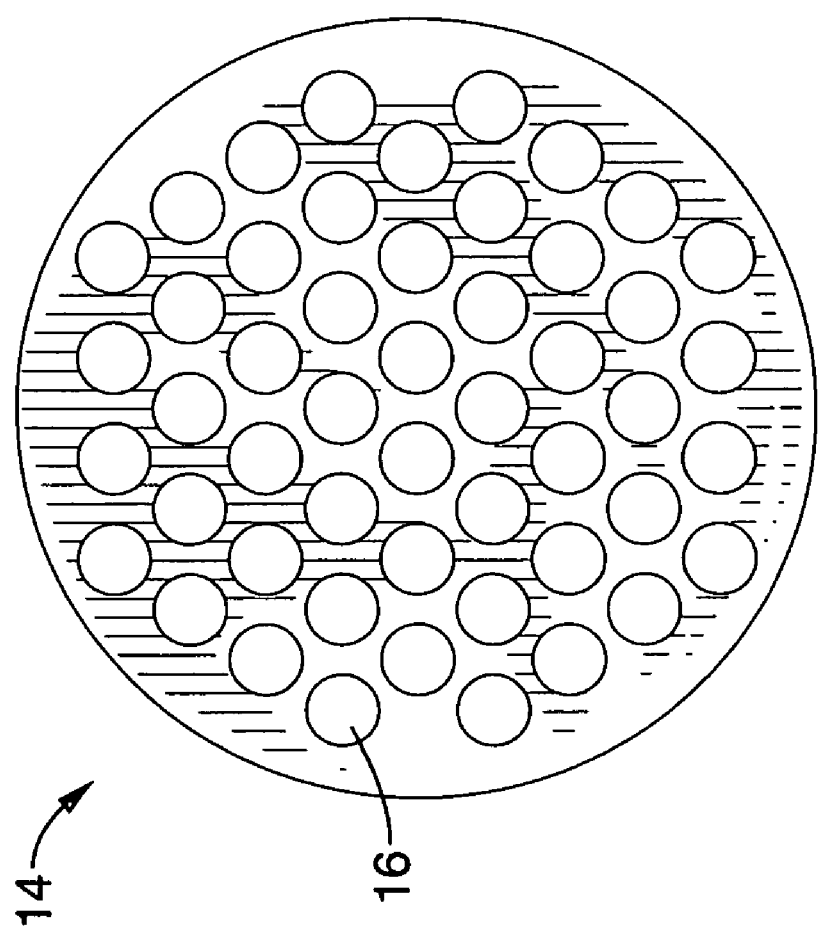
FIG. 3 is a top plan view of one metallic interconnect plate of the embodiment of a stack of electrochemical cells shown in FIG. 1.

Referring also FIG. 2 and FIG. 3, the electrochemical cell stack 10 has rows 12 of tubular electrochemical cells that are mounted to interconnect plates 14. The interconnect sheets or plates 14 are preferably between approximately 50 μm and approximately 5000 μm thick, and more preferably between approximately 100 μm and approximately 1000 μm thick (0.1 to 1.0 mm).

The interconnect plates 14 are preferably made of metal and have a plurality of holes 16. The circumference of the holes 16 is preferably configured with a rim that will orient the individual electrochemical cells 18 and hold the cells in place so that they can be sealed from leaking. Elongate tubes 20 of essentially gas tight electrochemical cells are formed, as the rows 12 of the array of electrochemical cells 18 are stacked upon each other as seen in FIG. 1. The resulting tubes 20 can be connected to manifolds 22, 24 that are connected to a source of gas. The source of gas can either be fuel or oxidants depending on the configuration of the electrochemical cells.

Manifolds 22, 24 allow fuel or oxidants to be recycled so that the threshold concentration of fuel can be maximized so that optimum concentrations of fuel are present at the anodes. Likewise, oxidants can be recycled to optimize concentrations at the cathode and improve the efficiency of the system. In one embodiment, the water, contaminants, partially reacted fuel, and other reaction products are separated from the excess fuel exhausting from the stack and the fuel is returned to the supply side of the apparatus. Thus, the efficiency of the system can be increased by fully utilizing the fuel that is produced for the electrochemical device for the production of electricity, for example, rather than losing the fuel to combustion as occurs in conventional fuel cell stacks.

It will be seen that the array of rows 12 of electrochemical cells are connected in parallel to the conductive metallic interconnect plate 14. The interconnect plates 14 are connected in series to increase the capacity of the apparatus. The series array design has been shown to improve stack efficiency by producing a power output that is 10% greater than the output of a single cell with the same active area.

Metals used for interconnecting sheets 14 include but are not limited to: Ni, Cu, alloys containing Ni, Ni based superalloys, alloys containing Cu, alloys containing Fe, stainless steel, Fe based alloys containing Cr, Fe—Cr alloys containing a reactive element such as Y or La, austenitic steels such as AISI 304 or 316, ferritic steels such as AISI 430 or 446, Al containing alloys, Fe—Cr alloys containing Al and a reactive element such as Y, Fe—Cr alloys containing 0.1 to 3.0 wt % Mn, Fe—Cr alloys containing 12-30 wt % Cr, Fe—Cr alloys containing 16-26 wt % Cr, Fe based alloys containing 18 to 22 wt % Cr with 0.5 to 2.0 wt % Mn and 0.1 to 1.0 wt % Y. Surface modification of part or all of the metal by sol-gel deposition, vapor deposition, plasma spray, plating, or any other means know in the art is also suitable. Coating part or the entire metal surface of the interconnect 14 with a catalyst, such as a reforming catalyst used for reforming hydrocarbon containing fuels, is also contemplated.

The parallel connections of each of the electrochemical cells 18 with plate 14 will also increase the reliability of the stack. One deficiency that is observed in conventional fuel cell stack designs is that defects in individual fuel cells that occur during manufacture or damage to cells that occurs during transportation and handling may not become apparent until all of the cells are installed in a unitary stack and the apparatus is activated. Defects in an individual cell may be seen as poor electrical production from the stack. Defective cells may also affect the performance of adjacent cells. Furthermore, the physical stacking of multiple fuel cells in series will not allow the replacement of a single defective cell with a new cell in conventional stacks. Consequently, the entire stack may need to be replaced due to defects or failure of a single cell.

The tubular electrochemical cell design of the present invention will not lead to the catastrophic failure of the stack with defects or failure of one electrochemical cell 18. Inefficiencies or failure of one cell may slightly reduce the overall output of the row 12 of cells but should not affect the production of neighboring electrochemical cells 18 in the row or adjacent rows of cells. The redundancy via the interconnect plate allows current to be conducted through one of the many other parallel cells in the row 12.

In addition, because the small tubular cells are independent of each other, the apparatus 10 can accommodate large thermal gradients without placing the individual cells 18 in danger of failure. One of the products of the chemical reactions of the fuel cell may be heat creating thermal gradients through the stack. Excess heat may be removed by blowing air through the stacks or other methods of regulating temperature. Heat from the stack can be removed through the flat metal interconnects 14 that can act as cooling fins in one embodiment of the invention where the interconnect plates extend beyond the area containing the row 12 of cylindrical fuel cells as seen in FIG. 2. This embodiment reduces the amount of excess air that may be required to be blown through the stacks to remove the excess heat. It can also be seen that the presence of multiple metallic heat conducting sheets will help equalize the heat distribution within the stack. Local cooling of some plates can normalize the overall operating temperature of the stack.

As shown generally in FIG. 2, the stack 10 of electrochemical cells 18 is preferably contained in an insulated gas tight housing 26 that can contain fuel or oxidants depending on the configuration of the electrochemical cells 18. In the embodiment shown in FIG. 2, heat from the metal interconnect plates 14 is used in a heat exchanger 28 that is used to pre-heat fuel gas or oxidants before introduction into the stack to improve efficiency.

Additionally, ceramics are capable of carrying far greater compressive forces than tensile forces. Uneven plates and tensile forces applied during use or during cooling periods in conventional fuel cell stacks can lead to cracks and breaks in the electrolyte and ultimately to the destruction of the individual cells. Accordingly, uneven or excessive loads applied to thin electrolyte electrochemical cells can cause the cells to delaminate or break even when the plates are constructed under very tight tolerances. It will be appreciated that the tubular electrochemical cells 18 are of uniform size and experience primarily compressive forces from the adjacent rows of cells and interconnect plates. Consequently, the tubular electrochemical cells 18 are durable and resistant to thermal shock.

It will also be seen that the distribution of electrochemical cells 18 within the stack 10 can vary to optimize the efficiency of the stack and account for thermal differences that may be in the stack. Unit cells 18 in the rows 12 of the stack need not be the same size or contain the same electrolyte, cathode, anode, and/or support materials. For example, in a fuel cell stack, ceria based electrolyte cells can be used for lower temperature regions or regions near the fuel inlet or exit in the stack and/or proton conducting electrolyte cells (such as doped $SrCeO_3$ or $BaZrO_3$) could be used in the interior region, and/or doped zirconia based electrolyte cells could be used near the high temperature anode gas exit. Such designs improve the performance of the stack by improving the performance near the inlet by utilizing a higher conductivity electrolyte, reducing the steam requirements near the inlet, and by removing Hg from the anode chamber and thereby reducing the partial pressure of water on the fuel side thus increasing the fuel utilization. The optimum distribution of each cell 18 would be determined by the particular fuel choice and stack configuration. Accordingly, the electrochemical cell stack assembly of the present invention has great flexibility in design configuration.

Figure 5:
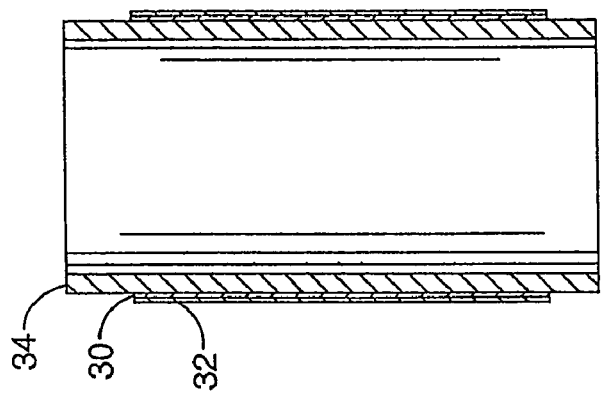
FIG. 5 is a cross sectional view of one embodiment of a tubular fuel cell taken along the lines 5-5 of FIG. 4.
Figure 4:
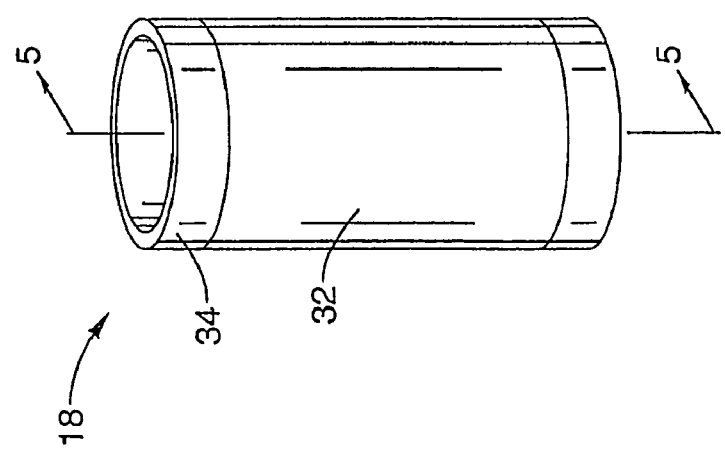
FIG. 4 is a perspective view of one tubular electrochemical cell according to the present invention.

Turning now to FIG. 4 and FIG. 5, a single electrochemical cell 18 according to one embodiment of the invention is shown. Electrochemical cells 18 generally comprise an ion-conducting electrolyte 30 sandwiched between a porous anode 32 and cathode 34 in fuel cell applications. Although a fuel cell is used as an example of an electrochemical cell for purposes of illustration, it will be understood that the electrochemical cell may be an oxygen generator, syngas generator or hydrogen gas separator and similar devices.

Electrochemical cells 18 can be either anode supported, cathode supported or electrolyte supported. Electrode supported electrochemical cells 18 can have electrode supports that are a ceramic, a ceramic metal composite (cermet) or an alloy. In one embodiment, the cells are manufactured as bi-layers such as Ni-YSZ/YSZ or LSM/YSZ and the counter electrode is applied after the high temperature sintering of the bi-layer. In another embodiment, all three layers are applied and sintered in one high temperature step. For example, LSM/YSZ/YSZ or LSM/YSZ/Ni—YSZ tri-layers can be sintered in one step.

Additionally, I will be understood that the electrode supported structures can also be multi-layered or graded structures composed of different materials and/or microstructures and not simply a homogeneous electrode. For example, a cathode supported design could consist of an extruded or injected molded porous LSM support to which is applied a layer of porous LSM+YSZ and onto this is applied the YSZ electrolyte film and the counter electrode. Alternatively a porous catalytic layer, such as Ni—YSZ, can be positioned between a porous alloy layer, such as a ferritic steel, and the electrolyte layer, such as YSZ.

The embodiment illustrated in FIG. 4 and FIG. 5 is a cathode supported electrochemical cell 18. In this embodiment, the cathode material is formed into a thin tube by injection molding, centrifugal casting, slip-casting, tape-casting, extrusion, co-extrusion, isostatic pressing, eletrophoretic deposition, dip coating, aerosol spray, and many other methods know in the art of ceramics processing and powder metallurgy are possible for producing porous substrates suitable for thin film deposition. Extrusion or injection molding are the preferred methods of support structure production. Anode supported electrochemical cells 18 are formed in similar fashion. In another embodiment, the anode, electrolyte, and cathode are disposed on a tubular porous support, preferably made of powdered metal or cermet. The anode, electrolyte and cathode are preferably disposed on the porous metal support as thin films.

The preferred height of the electrochemical cell 18 is determined by the conductivity of the electrode layers. For ceramic supported structures the electrochemical cell 18 is preferably between approximately 1 cm to approximately 5 cm in height. For metal supported electrochemical cell structures the cells 18 are preferably between approximately 2 cm and approximately 10 cm in height.

The cathode electrode 34 is preferably a cylindrical or rectangular tube ranging in thickness from approximately 100 µm to approximately 3000 µm in cathode supported embodiments. However, cathode layers ranging in thickness of between approximately 150 µm to approximately 2000 µm are especially preferred. In anode supported electrochemical cells, the cathode 34 is preferably applied as a thin film to one surface of the electrolyte 30 and bonded to provide a cathode electrode 34 ranging in thickness of between approximately 50 µm to approximately 1500 µm. It will be understood that the selected thickness of the electrode tubes and electrolyte can vary depending on the thermal expansion, electronic conductivity and ionic conductivity characteristics of the electrode and electrolyte materials.

Suitable cathode electrode 30 materials in accordance with the present invention include cermets and ceramics. For example, other suitable ceramic components include: $La_{1-x}Sr_xMn_yO_{3-\delta}$ ($1 \geq X \geq 0.05$) ($0.95 \leq y \leq 1.15$) ("LSM") ($\delta$ is defined as that value signifying a small deviation from perfect stoichiometry), $La_{1-x}Sr_xCoO_{3-\delta}$ ($1 \geq X \geq 0.10$) ("LSC"), $La_{1-x}Sr_xFe_yO_{3-\delta}$ ($1 \geq X \geq 0.05$) ($0.95 \leq y \leq 1.15$) ("LSF"), $SrCo_{1-x}Fe_xO_{3-\delta}$ ($0.30 \geq X \geq 0.20$), $La_{0.6}Sr_{0.4}Co_{0.6}Fe_{0.4}O_{3-\delta}$, $Sr_{0.7}Ce_{0.3}MnO_{3-\delta}$, $LaNi_{0.6}Fe_{0.4}O_{3-\delta}$, $Sm_{0.5}Sr_{0.5}CoO_{3-\delta}$, yttria stabilized zirconia (YSZ), scandia stabilized zirconia (SSZ), $(CeO_2)_{0.8}(Gd_2O_3)_{0.2}$ (CGO), $La_{0.8}Sr_{0.2}Ga_{0.85}Mg_{0.15}O_{2.825}$ (LSGM20-15), $(Bi_2O_3)_{0.75}(Y_2O_3)_{0.25}$ and alumina.

Preferred LSM materials include $La_{0.8}Sr_{0.2}MnO_3$, $La_{0.65}Sr_{0.30}MnO_{3-\delta}$, and $La_{0.45}Sr_{0.55}MnO_{3-\delta}$. Suitable metal components for the cermets are transition metals, Cr, Fe, Ag and/or alloys such as low-chromium ferritic steels, such as type 405 and 409 (11-15% Cr), intermediate-chromium ferritic steels, such as type 430 and 434, (16-18% Cr), high-chromium ferritic steels, such as type 442, 446 and E-Brite (19-30% Cr), chrome-based alloys such as Cr5FelY and chrome-containing nickel-based alloys such as Ni20Cr and Inconel alloys including Inconel 600 (Ni 76%, Cr 15.5%, Fe 8%, Cu 0.2% Si 0.2%, Mn 0.5%, and C 0.08%).

A very thin layer of electrolyte 30 is preferably applied to the cathode tube 34. It has been shown that the operating temperature of an electrochemical cell can be reduced with the use of thin film ceramic electrolytes and electrodes because of the reduction of ohmic losses across ionic and ionic-electric conducting materials deposited as thin films. The bi-layer is then co-fired to yield a pinhole free, dense film of electrolyte that is well bonded to the porous structure of the electrode in one embodiment. The sintering behavior of both film and substrate materials should also be considered in the selection of electrolyte and electrode materials. For example, it may be necessary to fire the second electrode at a different temperature than used to give the electrolyte sufficient density to prevent gases from crossing the electrolyte layers or the temperature used to process the first electrode depending on the nature of the selected electrode material.

Several approaches to thin film fabrication are known in the art including physical vapor deposition techniques, tape calendaring, sol-gel deposition, sputtering, colloidal deposition, centrifugal casting, slip-casting, tape-casting, extrusion, screen printing, brushing, tape transfer, co-extrusion, electrophoretic deposition, dip coating, aerosol spray, vacuum infiltration, plasma deposition, electrochemical deposition, and many other methods know in the art. Dip coating, aerosol spray, and screen printing are preferred. Heating the layers to a sufficient temperature to ensure bonding of the porous support and densification of the electrolyte is typically required.

While there are many methods of creating thin films, it is preferred that the films be deposited using a colloidal deposition method. In this embodiment, the electrolyte material is generally prepared as a suspension of the powder material in a liquid media, such as water, isopropanol, and other suitable organic solvents. The suspension may be applied to a surface of an electrode layer by a variety of methods; for example, by aerosol spray, dip coating, electrophoretic deposition, vacuum infiltration, or tape casting. Typically, green films of the desired oxide are colloidally deposited onto green or partially fired substrates. In addition, the film should be well bonded to the surface of the substrate without excessive infiltration into the porosity of the electrode and there should be minimal polarization at the interface between the electrolyte and electrode.

The colloidal process is preferred because it is inexpensive and scaleable, and can produce devices with high performance at reduced temperatures. However, colloidal deposition of dense electrolyte layers on porous substrates requires that the materials be chemically compatible at the processing temperature and there must be an adequate thermal expansion match between the layers.

A pinhole and crack free dense layer of electrolyte 30 ranging from approximately 1 μm to approximately 50 μm in thickness on electrode substrates of high porosity and suitable microstructure to ensure low overpotential during device operation are generally preferred. For typical fuel cell applications, an electrolyte layer ranging from approximately 10 μm to approximately 30 μm in thickness is preferred.

The electrolyte material is preferably composed of a thin layer of a metal oxide (ceramic) powder, such as yttria stabilized zirconia (YSZ) (e.g., $(ZrO_2)_x,(Y_2O_3)_y$ where $(0.88 \geqq X \geqq 0.97)$ and $(0.03 \leqq y \leqq 0.12)$. The preferred material is $(ZrO_2)_{0.92}(Y_2O_3)_{0.08}$ or $(ZrO_2)_{0.90}(Y_2O_3)_{0.10}$ that are available commercially. Other possible electrolyte materials include $(ZrO_2)_{0.9}(Sc_2O_3)_{0.1}$ scandia stabilized zirconia (SSZ), $(CeO_2)_{0.8}(Gd_2O_3)_{0.2}$ (CGO), $La_{0.8}Sr_{0.2}Ga_{0.85}Mg_{0.15}O_{2.825}$ (LSGM20-15) and $(Bi_2O_3)_{0.75}(Y_2O_3)_{0.25}$. Alternatively, the electrolyte material may be a mixed ionic electronic conductor, for example $SrCo_{1-x}Fe_xO_{3-\delta}(0.30 \geqq X \geqq 20)$, $La_{0.6}Sr_{0.4}Co_{0.6}Fe_{0.4}O_{3-\delta}$, $Sm_{0.5}Sr_{0.5}CoO_3$ and $La_{1-x}, Sr_xCoO_{3-\delta}$. Such structures may also find use in oxygen separation devices, for example.

The anode electrode 32 on the cathode supported electrochemical cell 18 is preferably a thin film ranging in thickness from approximately 50 μm to 500 μm. However, electrode layers ranging in thickness of between approximately 150 μm to approximately 300 μm are preferred. In anode supported electrochemical cells 18, an anode tube ranging in thickness from between approximately 250 μm to approximately 2500 μm is preferred. In a preferred embodiment, the anode includes a material such as Ni—YSZ or Ni—CGO.

Electrode and electrolyte materials are preferably matched and the thickness of the applied materials may be selected based on the thermal expansion, electronic conductivity and ionic conductivity characteristics of the electrode and electrolyte materials as well as the interconnect materials. In addition, the thickness of the film of electrolyte 30 may depend the ability of the electrolyte material to be gas impermeable and maintain its mechanical integrity e.g. resist cracking when exposed to a range of operating and rest temperatures.

The interconnect plates 14 can be made of inexpensive ferritic steel materials which have a thermal expansion which match the typical electrode and electrolyte materials. It will be appreciated that the metallic interconnect plates 14 can be punched and stamped using low cost technology to provide a fitted junction between top and bottom rows 12 of electrochemical cells 18 and the interconnect plate 14.

Figure 6:
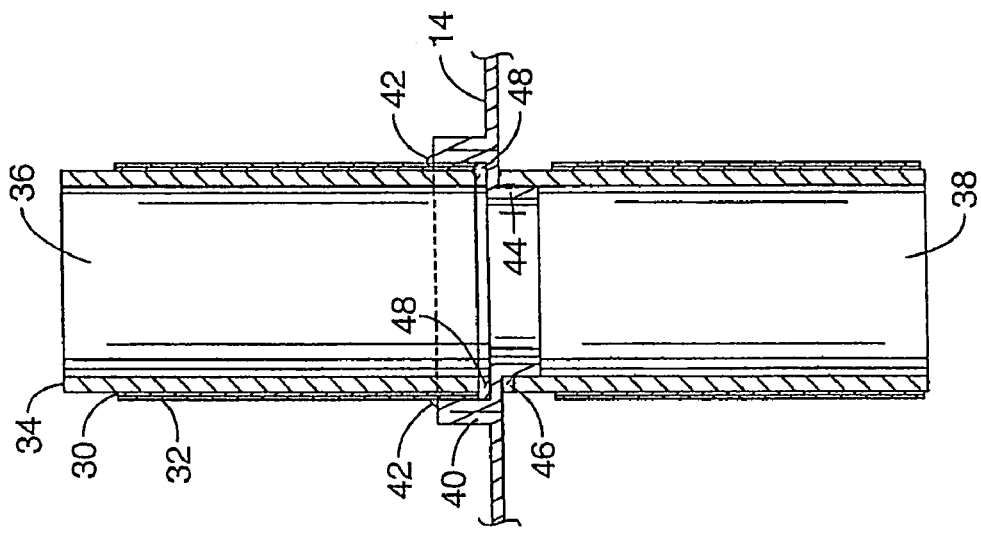
FIG. 6 is a side cross sectional view of one embodiment of a junction between a top electrochemical cell and a bottom electrochemical cell with the metallic interconnect plate according to the present invention.

Referring also to FIG. 6 through FIG. 10, several embodiments of stamped interconnect designs are shown in cross section with a top electrochemical cell 36 and a bottom electrochemical cell 38 and one stamped hole 16 design in interconnect plate 14. In FIG. 6, it can be seen that interconnect plate 14 has been punched and stamped to provide a seat for the top and bottom electrochemical cells 36, 38. In the embodiment shown, the electrochemical cells 36, 38 are cathode 34 supported with a thin electrolyte 30 and exterior anode 32. The top electrochemical cell 36 preferably has a metal to electrode pressure contact from the top vertical collar 40 of interconnect plate 14 to the anode 32 of the cell 36 and provides an electrical contact from the cell 18 to the plate 14. In one embodiment, the collar 40 is sealed to the anode electrode with a sealing material 42.

The interior of the tubular bottom electrochemical cell 34 receives a vertical ring 40 of plate 14 and the ring is in contact with the cathode 30 in the embodiment shown in FIG. 6. The top end of the bottom electrochemical cell 34 is preferably sealed with the interconnect plate with metal, glass or ceramic seals 42.

Sealing the individual electrochemical cell 18 to the preferably metal interconnect sheet 14 may be accomplished with ceramic, glass, glass-ceramic, cermet, alloy brazes, or welds. The electronically insulating seals are preferably alumina, silica, or titania containing ceramic pastes or cermets. The electronically conductive seals are preferably brazes based on Ag, Cu, or Ni alloys, or brazing alloys mixed with ceramics such as alumina, silica, or titania. Brazes can be applied as foils or paints. Paints are typically applied by spray, brush, roller, or screen printing.

Note that the anode 32 or the electrolyte 30 of the bottom electrochemical cell 38 is not in contact with the interconnect plate 14. The only contact that the bottom electrochemical cell 38 has with the interconnect plate 14 is the contact ring 44 has with the cathode 34. Note also that it is preferred that the only contact that the top electrochemical cell 36 has with the interconnect plate 14 is with the anode 32. The cathode 34 and the electrolyte 30 of the bottom electrochemical cell 38 are preferably sealed to the interconnect plate 14 with a glass or ceramic seal 46.

Figure 7:
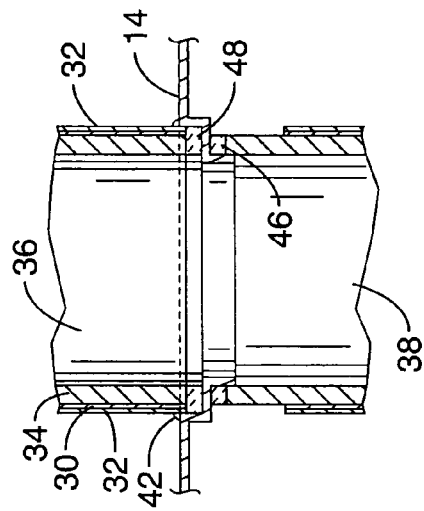
FIG. 7 is a side cross sectional view of an alternative embodiment of a junction between top and bottom electrochemical cells with the metallic interconnect plate according to the present invention.
Figure 8:
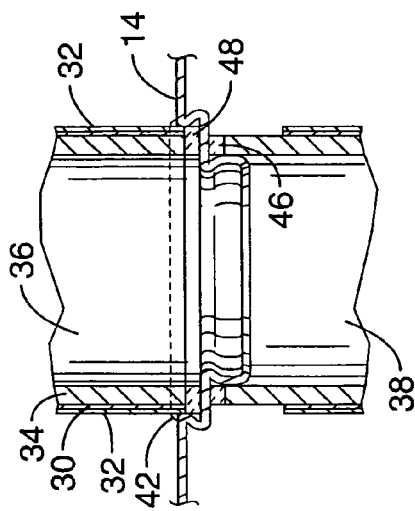
FIG. 8 is a side cross sectional view of an alternative embodiment of a junction between top and bottom electrochemical cells with the metallic interconnect plate according to the present invention.

FIG. 7 and FIG. 8 are alternative embodiments of stamped interconnect plate 14 providing an electrical contact with the anode on the side of the tubular electrochemical cells 36, 38. Anode-interconnect seams may be sealed with a sealing material as described above.

Figure 9:
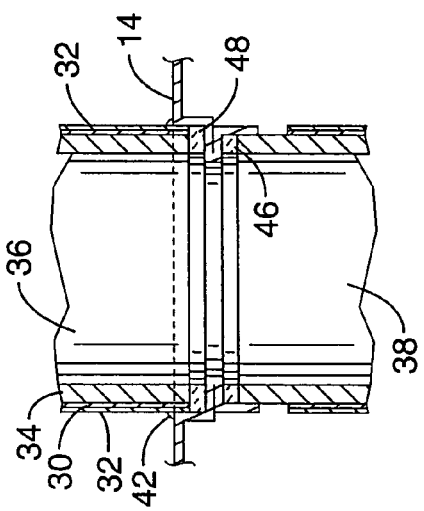
FIG. 9 is a side cross sectional view of an alternative embodiment of a junction between top and bottom electrochemical cells with the metallic interconnect plate according to the present invention.
Figure 10:
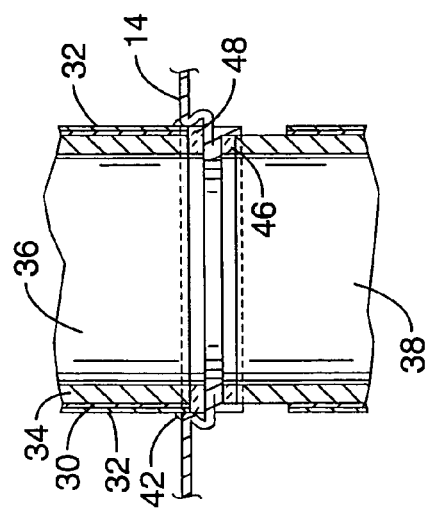
FIG. 10 is a side cross sectional view of an alternative embodiment of a junction between top and bottom electrochemical cells with the metallic interconnect plate according to the present invention.
Figure 14:
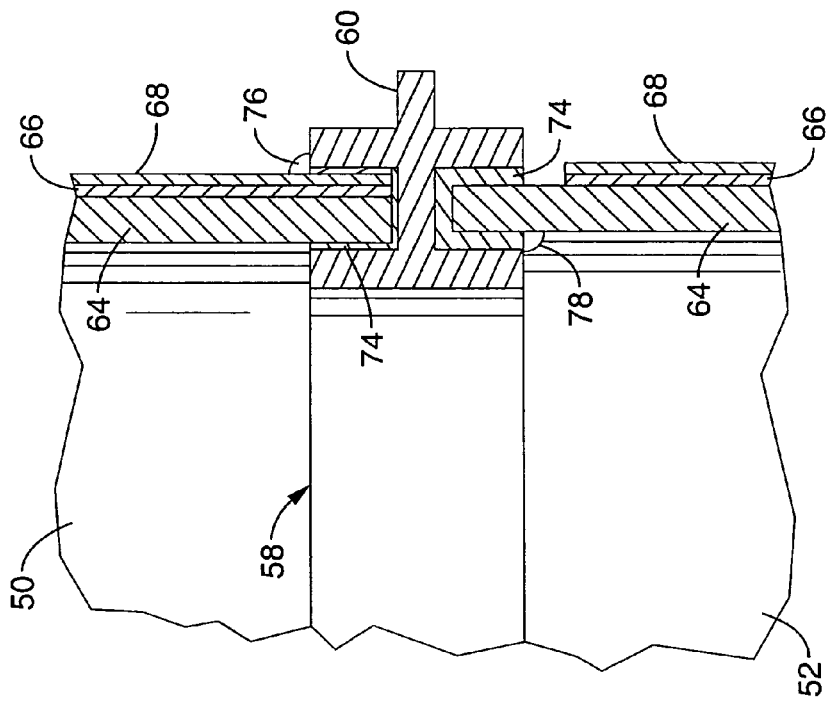
FIG. 14 is detailed sectional view of an alternative embodiment of the sealing of a ferrule junction between top and bottom electrochemical cells.

FIG. 9 and FIG. 10 are alternative embodiments of stamped interconnects 14 that utilize spring seal edges. In these embodiments the stamped edges of the perforations 16 are biased to seat and seal the top and bottom electrochemical cells 36, 38. If the compression seals are insufficient, then sealing material can be applied at the anode interconnect seam in the embodiments shown in FIG. 9 and FIG. 10 as described previously.

Turning now to FIG. 11 through FIG. 15, an alternative embodiment of an interconnect-electrochemical cell junction is generally shown. In this embodiment, the top and bottom electrochemical cells 50, 52 may be inserted into top and bottom annular grooves 54, 56 respectively of ferrule 58 and sealed. The unit of ferrule 58, top electrochemical cell 50 and bottom electrochemical cell 52 is then inserted into a holes 16 the interconnect sheet 14 and attached to the sheet 14 with an outer lip 60 around the periphery of the ferrule 58. The outer lip 60 of the ferrule 58 may not only be used to bond to the metal sheet but to provide a parallel connection within the stack.

Figure 13:
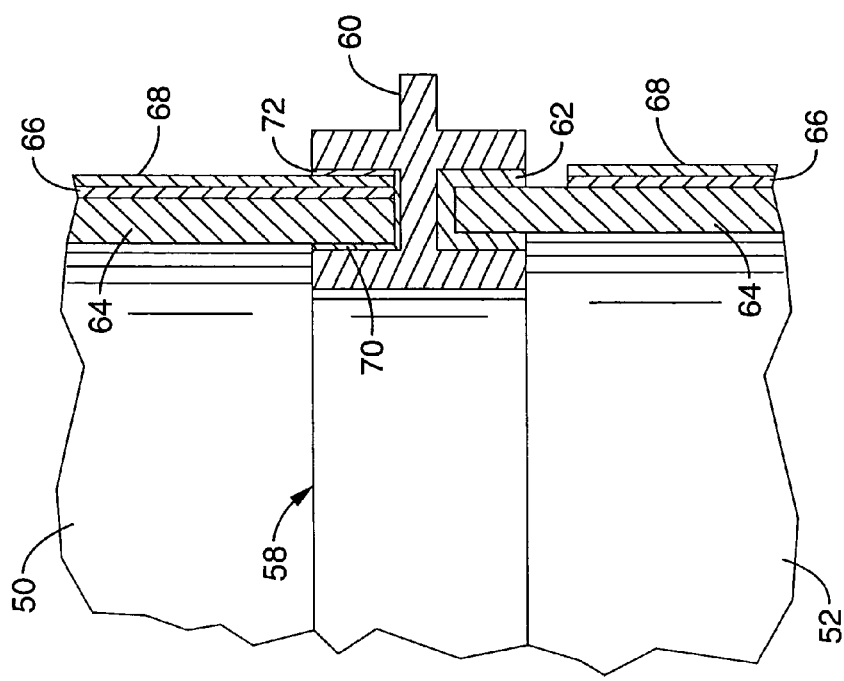
FIG. 13 is a detailed sectional view of a ferrule junction between top and bottom electrochemical cells.

Turning now to FIG. 13, the details of one embodiment of a junction of the ferrule 58 and the top and bottom electrochemical cells 50, 52 are shown. In this embodiment, the cathode 64 of the bottom electrochemical cell 52 is sealed in groove 56 of ferrule 58 with an electronically conductive sealant 62. Neither the anode 68 nor the electrolyte 66 are in contact with the ferrule 58 in this embodiment. The top electrochemical cell 50 is inserted into top groove 54 of ferrule 58 with the bottom and side of cathode 64 sealed to the groove with a non-conducting sealant 70. The anode 68 of electrochemical cell 50 is bonded to the wall of groove 54 of ferrule 58 with an electrically conductive sealant 72 in the embodiment shown in FIG. 13.

An alternative embodiment of a junction showing the sealing of top and bottom electrochemical cells 50, 52 to ferrule 58 is seen. In this embodiment, the bottom edge of the top electrochemical cell 50 is disposed in groove 54 of ferrule 58 and sealed with an electrically non-conductive sealant 74. Similarly, bottom electrochemical cell 52 is placed in groove 56 of ferrule 58 and sealed with an electrically non-conductive sealant 74.

The anode 68 of the top electrochemical cell 50 is further joined and sealed to the ferrule 58 with an electronically conductive paste 78 or similar conductive sealant or connective material. The conductive paste 76 preferably provides a good contact for the movement of electrons from the anode 68. Likewise, the cathode 64 of the bottom electrochemical cell 52 has an electronically conductive paste 78 or the like that brings the cathode 64 in contact with the ferrule 58.

Figure 15:
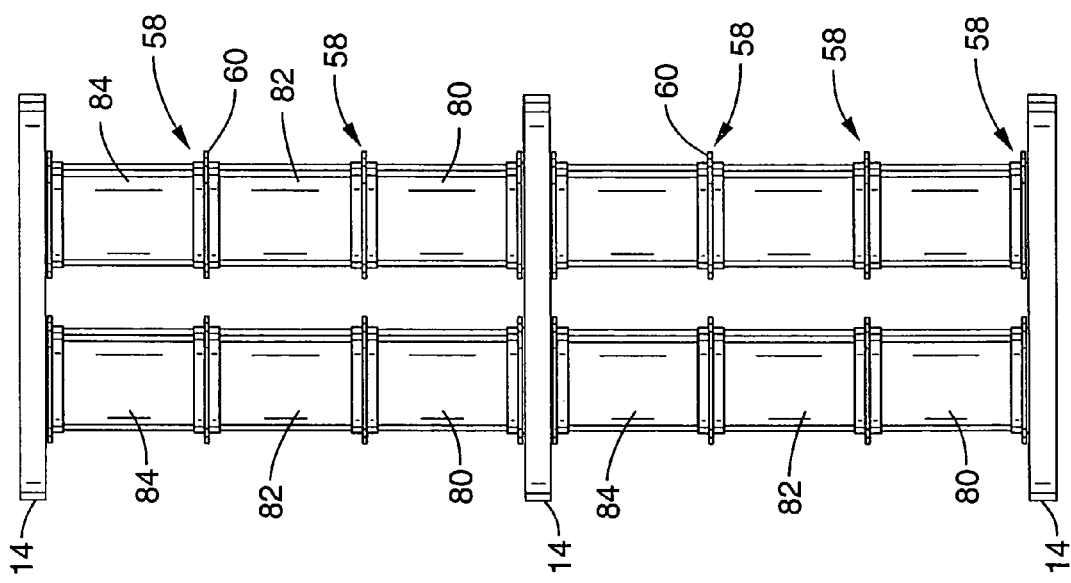
FIG. 15 is an alternative embodiment of an electrochemical stack according to the present invention using ferrules and interconnect plates.

Turning now to FIG. 15, an alternative embodiment of the invention with a paired multiple cell stack using ferrules and interconnect plates 14 is seen. In this embodiment a single electrochemical cell can be connected in series with N cells between the parallel connecting plates where N=1-100, preferably N=2-10. Shown in the FIG. 15 are two parallel rows of tubes, each containing three electrochemical cells in series (N=3).

It has been seen that devices that carry current can fail either in the open condition or in a shorted condition. Information about the failure mode of a device can be used to further optimize the stack design. Failure of one cell by shorting will not short all of the cells positioned between the parallel plates.

In this embodiment, a bottom electrochemical cell 80 is mounted and sealed to a ferrule 58 which is then sealed to a base interconnect plate 14 as described previously. A second ferrule 58 is sealed to the distal end of electrochemical cell 80. A middle electrochemical cell 82 is sealed with the second ferrule 58 and with a third ferrule at the distal end of the cell 82. A third cell 84 is sealed to the third ferrule at one end and a fourth ferrule at the other. The fourth ferrule is mounted to an interconnect plate 14.

Accordingly, the electrochemical cells may be sealed directly to the interconnect plate 14 or the cell may first be attached to a ferrule 58 and then inserted into the plate 14. A ferrule 58 can be applied to one or both ends of the electrochemical device repeat unit (single cell). In another embodiment, one ferrule 58 may be designed such that it will fit into a second ferrule or into the metal sheet with male/female connections (not shown).

With the use of a module of a ferrule 58 and mounted electrochemical cells, the composition of the ferrule 58 can be different from the composition of the interconnect plate 14 and the manufacturing conditions can be varied. For example, brazing or bonding the ferrule 58 to the tubular electrochemical cells 50, 52 can be separate from bonding or connecting the ferrule 58 to the interconnect plate 14 and allows the use of alumina or silica forming alloys as the interconnect sheet 14 without forming highly resistive interfaces.

Individual tubular cells or a series of electrochemical cells as seen in FIG. 15 can be brazed to a Ni or Cu or stainless steel ferrule 58 using, for example a AgCuTi braze for the electronically conductive seal between the ferrule and the support electrode of the cell. Pastes, sealants and brazes may be applied to the interconnect sheet 14 or to the ferrule 58 or to the electrochemical cells 80, 82 or 84 as well as to a combination of these components depending on the deposition technology used (i.e. dip coating, screen printing, roll, brush, etc).

In the embodiment shown in FIG. 15, alumina paste may be used for the non-conducting seal between the second ferrule and the cell; and a AgCuTi braze could then be used to electronically connect the second ferrule to the counter electrode so that an electrical path would be created through the first ferrule to the support electrode, through the electrolyte to the second counter electrode, and then to the second ferrule.

The ferrule in this structure can then be spot welded to an alumina forming alloy interconnect sheet 14 (typically an Fe based alloy containing Cr Al and Y and commonly designated as FeCrAlY). It will be appreciated that the inner part of the weld would not be subject to oxidation and so would maintain electrical contact between the metal interconnect sheet 14 and the ferrule 58. This allows a high temperature alloy that forms an electronically insulating scale to be bonded electrically to the cell or cell series via a weld or similar method.

Similarly an alumina forming alloy (such as FeCrAlY) can have metal gaskets, for example of Ni or Cu rings, located around the opening for the gas flow to the tubular cell, that are welded to the FeCrAlY sheet. The ferrule or cell is bonded or brazed to this metal rather than the FeCrAlY. This again allows the use of an alloy that forms a highly adherent though electronically non-conductive scale to be used as the interconnect plate.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An electrochemical cell stack assembly, comprising:
    an electrically conductive metal interconnect plate having a hole therethrough wherein the hole has a rim configured on a circumference thereof;
    a first tubular electrochemical cell having a porous anode, a porous cathode and a substantially gas impermeable ion conducting electrolyte;
    a second tubular electrochemical cell having a porous anode, a porous cathode and a substantially gas impermeable ion conducting electrolyte;
    wherein the electrolyte of said first tubular electrochemical cell and said second tubular electrochemical cell comprises a material selected from the group consisting essentially of doped zirconia, doped ceria and doped lanthanum gallate;
    each of said electrochemical cells further comprises a porous metal support; wherein said porous cathode, said electrolyte and said porous anode are disposed on said porous metal support, respectively;
    wherein said rim receives an end of each of said first tubular electrochemical cell and said second tubular electrochemical cell and orients said first and second tubular electrochemical cells such that interconnect plate electrically connects the porous anode of the first tubular cell to the porous cathode of the second tubular cell, and wherein the first tubular electrochemical cell and the second tubular electrochemical cell are each oriented on opposite sides of said hole to form a gas passageway therebetween.

2. An electrochemical stack assembly as recited in claim 1, wherein said porous cathode of said tubular electrochemical cell is dimensioned to support an electrolyte layer and an anode layer.

3. An electrochemical stack assembly as recited in claim 2, wherein said cathode comprises a porous support with a thickness between 100 µm and 3000 µm.

4. An electrochemical stack assembly as recited in claim 2, wherein said cathode comprises a porous support with a thickness between 150 µm and 2000 µm.

5. An electrochemical device assembly as recited in claim 1, wherein said cathode comprises a material selected from the group consisting essentially of $La_{1-x}Sr_xMn_yO_{3-\delta}$ wherein $1 \geq x \geq 0.05$ and $0.95 \leq y \leq 1.15$, $La_{1-x}Sr_xCoO_{3-\delta}$ wherein $1 \geq x \geq 0.10$, $La_{1-x}Sr_xFe_yO_{3-\delta}$ wherein $1 \geq x \geq 0.05$ and $0.95 \leq y \leq 1.15$; $SrCo_{1-x}Fe_xO_{3-\delta}$ wherein $0.30 \geq x \geq 0.20$; $La_{0.6}Sr_{0.4}Co_{0.6}Fe_{0.4}O_{3-\delta}$, $Sr_{0.7}Ce_{0.3}MnO_{3-\delta}$, $LaNi_{0.6}Fe_{0.4}O_{3-\delta}$, $Sm_{0.5}Sr_{0.5}CoO_{3-\delta}$, yttria stabilized zirconia, scandia stabilized zirconia, $(CeO_2)_{0.8}(Gd_2O_3)_{0.2}$, $La_{0.8}Sr_{0.2}Ga_{0.85}Mg_{0.15}O_{2.825}$(LSGM20-15), $(Bi_2O_3)_{0.75}(Y_2O_3)_{0.25}$ and alumina.

6. An electrochemical stack assembly as recited in claim 1, wherein said electrolyte of said tubular electrochemical cell is dimensioned to support a cathode layer and an anode layer.

7. An electrochemical stack assembly as recited in claim 2, wherein said electrolyte comprises a thin film of electrolyte with a thickness between 1 µm and 50 µm applied to said cathode support.

8. An electrochemical stack assembly as recited in claim 7, wherein said anode comprises a thin film applied to said thin film of electrolyte, said anode having a thickness within the range of 50 µm to 500 µm.

9. An electrochemical stack assembly as recited in claim 7, wherein said anode comprises a thin film with a thickness between 150 µm and 300 µm applied to said electrolyte layer.

10. An electrochemical stack assembly as recited in claim 1, wherein said porous anode of said tubular electrochemical cell is dimensioned to support an electrolyte layer and a cathode layer.

11. An electrochemical stack assembly as recited in claim 10, wherein said anode comprises a porous support with a thickness between 250 µm and 2500 µm.

12. An electrochemical device assembly as recited in claim 1, wherein said anode comprises a material selected from the group consisting essentially of Ni-yttrium stabilized zirconium and Ni—$(CeO_2)_{0.8}(Gd_2O_3)_{0.2}$.

13. An electrochemical cell stack assembly as recited in claim 1, wherein said tubular electrochemical cells are between 1 cm and 10 cm along the long axis of the tube.

14. An electrochemical cell stack assembly as recited in claim 1, further comprising a first gas conducting manifold configured to direct gas through said passageway of said stacked electrochemical cells.

15. An electrochemical cell stack assembly as recited in claim 14, further comprising means for preheating gases before entry into said first manifold.

16. An electrochemical cell stack assembly as recited in claim 14, further comprising a second gas conducting manifold configured to receive gas from said passageway of said stacked electrochemical cells.

17. An electrochemical cell stack assembly as recited in claim 16, wherein said second gas manifold is operably connected to a gas purifier configured to separate reaction products from unreacted gas.

18. An electrochemical cell stack assembly as recited in claim 1, further comprising means for removing excess heat from the stack.

19. An electrochemical cell stack assembly as recited in claim 18, wherein said means for removing excess heat from the stack comprises a heat exchanger operably coupled to said interconnect plate.

\* \* \* \* \*